US008364945B2

(12) United States Patent
Ward et al.

(10) Patent No.: US 8,364,945 B2
(45) Date of Patent: Jan. 29, 2013

(54) PROVISIONING AN UNKNOWN COMPUTER SYSTEM

(75) Inventors: Daniel Ward, Renton, WA (US); Shantanu Sardesai, Sammamish, WA (US); Kerwin Medina, Sammamish, WA (US); Ravikiran Chintalapudi, Bothel, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 12/141,925

(22) Filed: Jun. 19, 2008

(65) Prior Publication Data

US 2009/0319766 A1 Dec. 24, 2009

(51) Int. Cl.
G06F 9/00 (2006.01)
G06F 15/16 (2006.01)
G06F 15/173 (2006.01)
G06F 9/445 (2006.01)
G06F 21/00 (2006.01)
H04L 9/32 (2006.01)
H04L 12/66 (2006.01)

(52) U.S. Cl. ............ 713/100; 713/2; 713/168; 709/230; 709/224; 709/227; 717/174; 705/51; 370/356; 370/25

(58) Field of Classification Search .............. 713/2, 168, 713/1; 709/230, 227, 224; 717/174; 705/51; 370/356, 25; 707/9
See application file for complete search history.

(56) References Cited

U.S. PATENT DOCUMENTS

| | | | |
|---|---|---|---|
| 7,127,597 B2 | 10/2006 | Backman et al. | |
| 7,207,039 B2 | 4/2007 | Komarla et al. | |
| 7,266,084 B2 * | 9/2007 | Suonsivu et al. | 370/252 |
| 7,290,258 B2 | 10/2007 | Steeb et al. | |
| 7,350,201 B2 | 3/2008 | Ferri et al. | |
| 2002/0077984 A1 * | 6/2002 | Ireton | 705/51 |
| 2002/0124245 A1 | 9/2002 | Maddux et al. | |
| 2002/0199103 A1 * | 12/2002 | Dube | 713/168 |
| 2003/0097422 A1 | 5/2003 | Richards et al. | |
| 2004/0059900 A1 * | 3/2004 | Backman et al. | 713/1 |
| 2004/0088417 A1 * | 5/2004 | Bober et al. | 709/227 |
| 2004/0187104 A1 | 9/2004 | Sardesai et al. | |
| 2005/0138423 A1 | 6/2005 | Ranganathan | |
| 2005/0198629 A1 * | 9/2005 | Vishwanath | 717/174 |
| 2006/0168239 A1 * | 7/2006 | Gauthier | 709/227 |
| 2006/0230165 A1 * | 10/2006 | Zimmer et al. | 709/230 |
| 2006/0248082 A1 * | 11/2006 | Raikar et al. | 707/9 |

(Continued)

FOREIGN PATENT DOCUMENTS

EP 1429242 B1 4/2007

OTHER PUBLICATIONS

PXE Specification, Intel Corporation, Sep. 20, 1999, version 2.1.*

(Continued)

*Primary Examiner* — Thomas Lee
*Assistant Examiner* — Aurel Prifti
(74) *Attorney, Agent, or Firm* — Toler Law Group, PC

(57) ABSTRACT

A method of provisioning an unknown computer system is disclosed. The method includes detecting a computer system to be provisioned, determining that the computer system is unknown to a configuration management system, and identifying a global identifier and a digital certificate to be used to provision the computer system. The method further includes communicating the global identifier and the digital certificate from a network based boot strap server or from boot strap media to the computer system prior to loading an operating system onto the computer system.

9 Claims, 4 Drawing Sheets

U.S. PATENT DOCUMENTS

2007/0198820 A1      8/2007  Dickens et al.
2007/0283003 A1*    12/2007  Broyles et al. ............... 709/224
2007/0297396 A1*    12/2007  Eldar et al. ................... 370/356
2008/0229089 A1*     9/2008  Assouad et al. ................ 713/2

OTHER PUBLICATIONS

David Chappell, Introducing Microsoft System Center, Jan. 2007.*
Andrew Lee, Unkwown Device Identifier 5.02, May 12, 2006.*
How to Deploy an Operating System Image Using PXE http://technet.microsoft.com/en-us/library/bb694069.aspx.
News System Center SCCM SP1 & SCCM R2 en Version Beta http://systemcenter.fr/blogs/news/archive/2008/02/12/sccm-sp1-amp-sccm-r2-en-version-beta.aspx.
Operating System Deployment Security Best Practices and Privacy Information http://technet.microsoft.com/en-us/library/bb694228.aspx.
The Configuration Manager 2007 Software Development Kit (SDK) has been Released and is now Available on the Microsoft Download Center. http://ronni-pedersen.spaces.live.com/blog/cns!CF8D2BCE64196A5D!372.entry.

* cited by examiner

PROVISIONING AN UNKNOWN COMPUTER SYSTEM

BACKGROUND

Unknown system support is a desired data center service for enterprise class customers. Customers desire the capability to provision a system that is not known or managed in a fully automated, hands-off capacity to provide true end-to-end system management. A challenge with this service has been to provision unknown systems in a secure manner. While configuration management systems have used pre-execution environment (PXE) booted systems, manual intervention is performed by an administrator to first make the system known before initial provisioning of the unknown system.

SUMMARY

A method of provisioning an unknown computer system includes detecting a computer system to be provisioned, determining that the computer system is unknown to a configuration management system, and identifying a global identifier and a digital certificate to be used to provision the computer system. The method further includes communicating the global identifier and the digital certificate from a network based boot strap server or from boot strap media to the computer system prior to loading an operating system onto the computer system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The present disclosure is directed to a system and method of provisioning an unknown computer system with respect to a configuration management system. The system and method recognize an unknown computer system (e.g. a new computer added to a data center) and include functionality to communicate with the unknown computer system in an automated manner to facilitate booting up the unknown system and adapting the unknown system for control and access by the configuration management system. In a particular embodiment, the configuration management system includes a database, a management server, and a pre-execution environment (PXE) server to securely provision unknown computer systems. A global identifier and a digital certificate may be used during the provisioning process to enable secure communication with the unknown computer system. After provisioning of the unknown computer system, a task sequence is performed and a management agent is installed, such that the unknown computer system becomes known and such that configuration management operations may be performed. An administrator of the configuration management system thereby avoids or limits manual process steps associated with the initial provisioning and installation of new computer systems.

Figure 1:
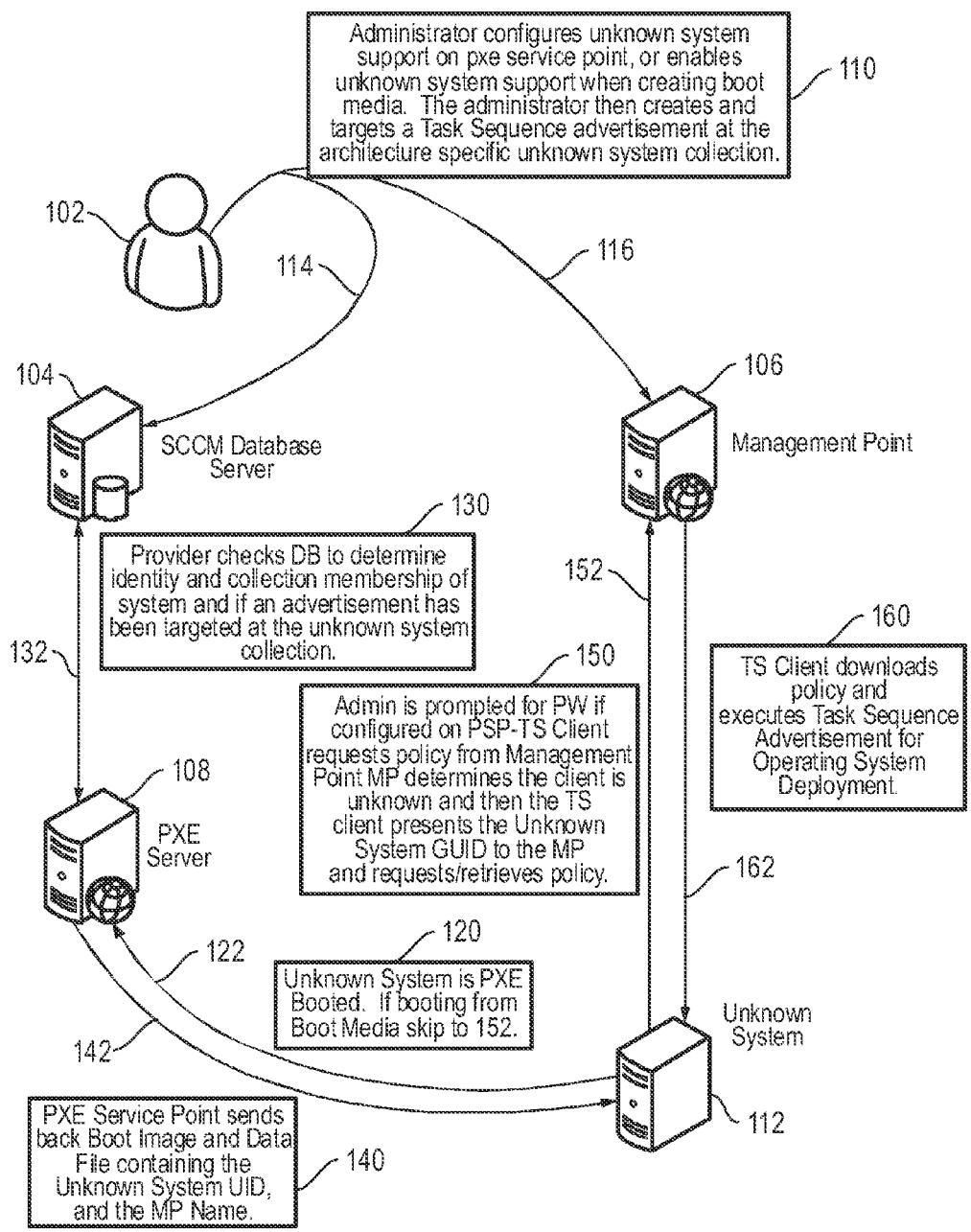
FIG. 1 is a general diagram that illustrates a particular embodiment of a system to provision an unknown computer system.

Referring to FIG. 1, a general diagram illustrates a particular embodiment of a system to provision an unknown computer system. The system includes a system center configuration manager (SCCM) database server 104, a management point 106, a Pre-execution environment (PXE) server 108, and an unknown system 112.

During operation, an administrator 102, represented as a user, configures an unknown system 112 for support by a PXE service point at the PXE server 108 or enables unknown system support when creating boot media, as shown at 110. The administrator 102 can include a device or may be a user of a device (e.g. PC, terminal, remote device). The administrator 102 creates and targets a task sequence advertisement at an architecture specific unknown system collection. The task sequence (TS) advertisement is communicated from the administrator 102 to the SCCM database server 104 via a task sequence message 114. A task sequence advertisement is also communicated from the administrator 102 to the management point 106 via a message 116.

After the task sequence advertisement has been communicated, the unknown system 112 may send a PXE boot message 122 to the PXE server 108, as shown at 120. In response to the received boot message 122, the PXE server 108 sends a request 132 to check a database for unknown system support. For example, the PXE server 108 may make a request to the SCCM database server 104. The SCCM database server 104 checks a database to determine identity and collection membership of the unknown system 112 and to determine whether an advertisement has targeted the unknown system collection, as shown at 130. In response to the request 132, the SCCM database server 104 provides a response to the PXE server 108 to indicate that the server 104 has received the task sequence advertisement targeting the unknown system 112.

In response to the task sequence advertisement and the response from the SCCM database server 104, the PXE server 108 provides a response message 142 to the unknown system 112. The response message 142 includes a boot image and a data file containing an unknown system global user identifier (GUID) and the management point name for the management point 106 identified to support the unknown system 112, as shown at 140. While the PXE server 108 is shown in FIG. 1, it should be understood that other pre-execution environment protocols or systems may be used to communicate the initial boot request and to provide a boot image from the PXE server 108 to the unknown system 112.

After the unknown system 112 receives the boot image, the data file, and the unknown system GUID, the unknown system 112 sends an inquiry message 152 to the management point 106. At this point, the administrator 102 is prompted for a password and if configured on the PXE server 108 and at a task sequence (TS) client, the TS client requests policy information from the management point 106 and determines that the client of the unknown system 112 is unknown, as shown at 150. Further, the task sequence client presents the unknown system GUID to the management point 106 and then requests and retrieves the requested policy information. The management point 106, in response to receiving the inquiry message 152 from the unknown system 112, downloads the requested policy information to the unknown system 112 and executes the previously received task sequence advertisement to activate operating system deployment on behalf of the unknown system 112. The download of the policy information and task sequence execution, is shown at 160. Upon receiving and executing the downloaded policy information and the task sequence advertisement to activate operating system deployment, the unknown system 112 becomes visible to the administrator 102 and is accessible for limited operations of an overall system management and control system, such as an enterprise configuration management system.

Figure 2:
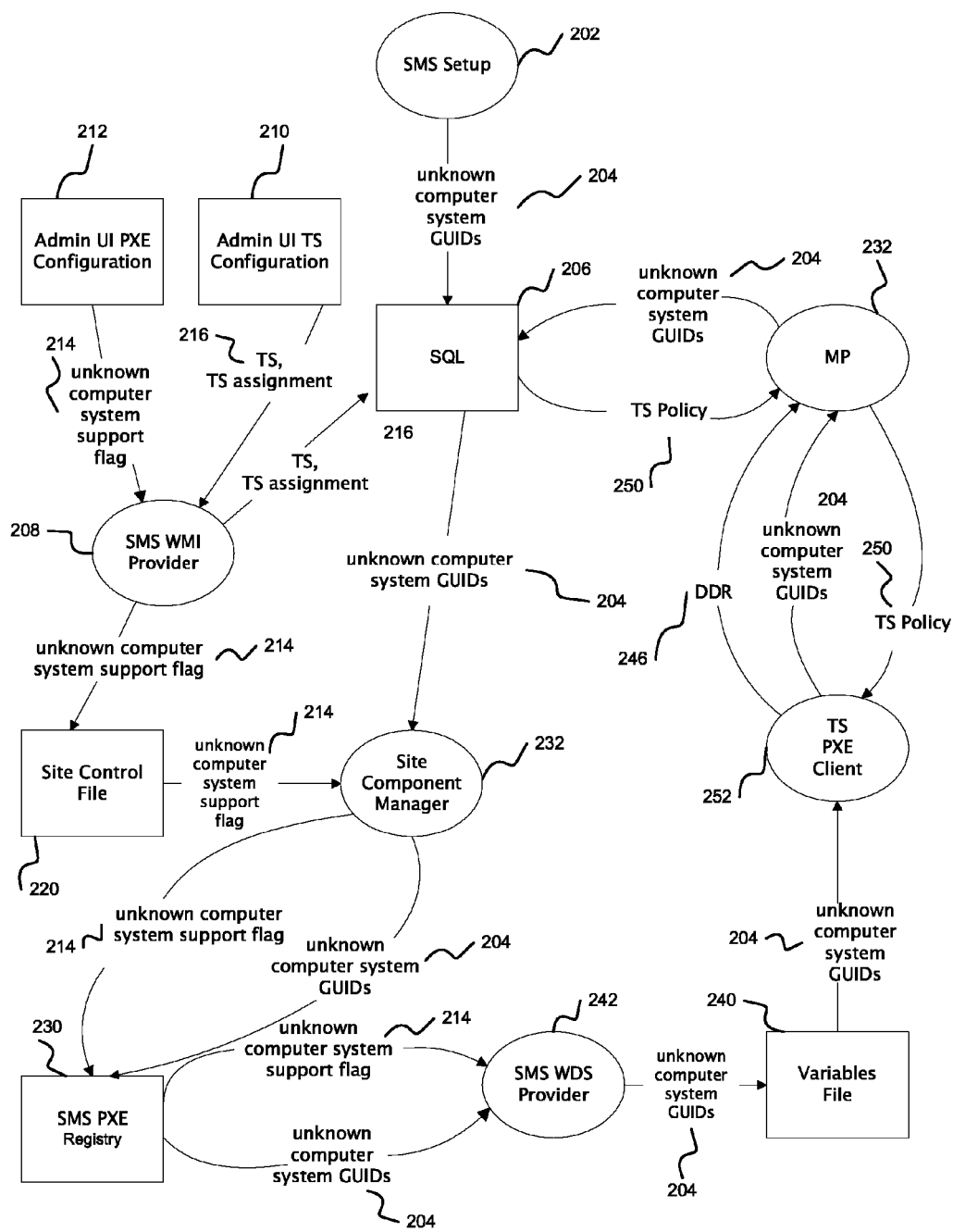
FIG. 2 is a general diagram that illustrates data structures used for provisioning of an unknown computer system.

Referring to FIG. 2, an illustrative example of data structures that may be used in connection with the configuration management system illustrated in FIG. 1 are shown. The exemplary data structures include an SQL data store 206, a site control file data store 220, a Systems Management Server (SMS) PXE registry data store 230, and a variables file data store 240. The data stores receive data and communicate data between them. For example, the SQL data store 206 receives an unknown computer system GUID 204 from a SMS setup process 202. The SQL data store 206 also receives a task sequence (TS) 216 from the SMS WMI provider 208. The SMS WMI provider 208 receives the task sequence 216 from the administrative user interface task sequence configuration module 210. The SMS Windows Management Instrumentation (WMI) provider 208 receives an unknown computer system support flag 214 from an administrator user interface PXE configuration module 212. The SQL data store 206 provides the unknown computer system GUID 204 to a site component manager 232. The site control file data store 220 receives the unknown computer system support flag 214 from the SMS WMI provider 208. The site component manager 232 receives the unknown computer system support flag 214 from the site control file data store 220.

The site component manager 232 provides the unknown computer system support flag 214 and the unknown computer system GUID 204 to the SMS PXE registry data store 230. The SMS PXE registry data store 230 in turn provides the unknown computer system support flag 214 and the unknown computer system GUID 204 to the SMS WDS provider 242. The SMS WDS provider 242 provides the unknown computer system GUID 204 to the variables file data store 240, and the unknown computer system GUID 204 is then provided to the task sequence (TS) PXE client 252.

The TS PXE client 252 provides the unknown computer system GUID 204 and a digital data record (DDR) file 246 to the management point (MP) at the site component manager 232. The management point 232 retrieves the task sequence policy 250 from the SQL data store 206 upon providing the unknown computer system GUID 204. The management point 232, provides a task sequence (TS) policy 250 to the TS PXE client 252. The above data structures are illustrative of a particular implementation. Alternative data structures or implementations may also be used.

The administrative functions of the configuration management system as illustrated in FIG. 1 may provide automatic communication and pre-execution download of task sequence policy information of an unknown computer system. Further, the system may deliver a complete end-to-end automated management experience, reduce administrative overhead, and provide additional security controls such that an administrator can employ specific systems provisioning policies for unknown systems. The system provisioning and policy management of unknown computer systems may thereby be enhanced.

In a particular embodiment, the system is implemented using a system center configuration manager infrastructure and related technologies. In addition, the system center configuration manager may utilize the PXE protocol. The system provides an automated solution to enable end-to-end operating system provisioning of bare metal systems in a zero or light touch user scenario. In addition, the system and method provides support for both 32-bit and 64-bit platforms (e.g., X86 and X64 platforms) that may be used in data center environments. Further, the system provides integration with existing system center configuration manager (SCCM) products and related products such as the PXE service point and media technologies. Security standards may be enhanced by use of security controls, such as password prompting and network configuration in connection with provisioning of unknown systems. Further, the system may provide a mechanism to track whether a system was known or unknown during provisioning which can provide useful information from an auditing perspective and for administration and management.

In addition, the use of task sequences specified for unknown systems may be selectively advertised for a collection known as "all unknown systems". Thus, the task sequence for pre-provisioned systems is identified and used for those systems determined to be unknown systems. The administrator may decide to create either collection variables on the unknown system collection or computer system based variables of static system resources having empty values. The system and method may utilize dedicated resources for unknown systems and identify such resources using a flag that identifies a particular system as an unknown system which can then be viewed in an un-provisioned systems folder under an Object-based storage device (OSD) node.

A task sequence client may proceed with task sequence execution on the un-provisioned systems identified in the un-provisioned systems folder. The task sequence client prompts the administrator to input variable values for those variables that are assigned to an unknown system collection or resource. The task sequence client proceeds with execution of the task sequence that is advertised with respect to the unknown system collection. In a particular embodiment, a Systems Management Server (SMS) client is installed and a discovery record is created as part of task sequence provisioning. Once a data record (DDR) has been created, the system resource with the unknown system flag set will be cleared or removed from the un-provisioned system folder. The administrator may then review the task sequence advertisement report and identify that the particular system was an unknown system prior to provisioning.

Figure 3:
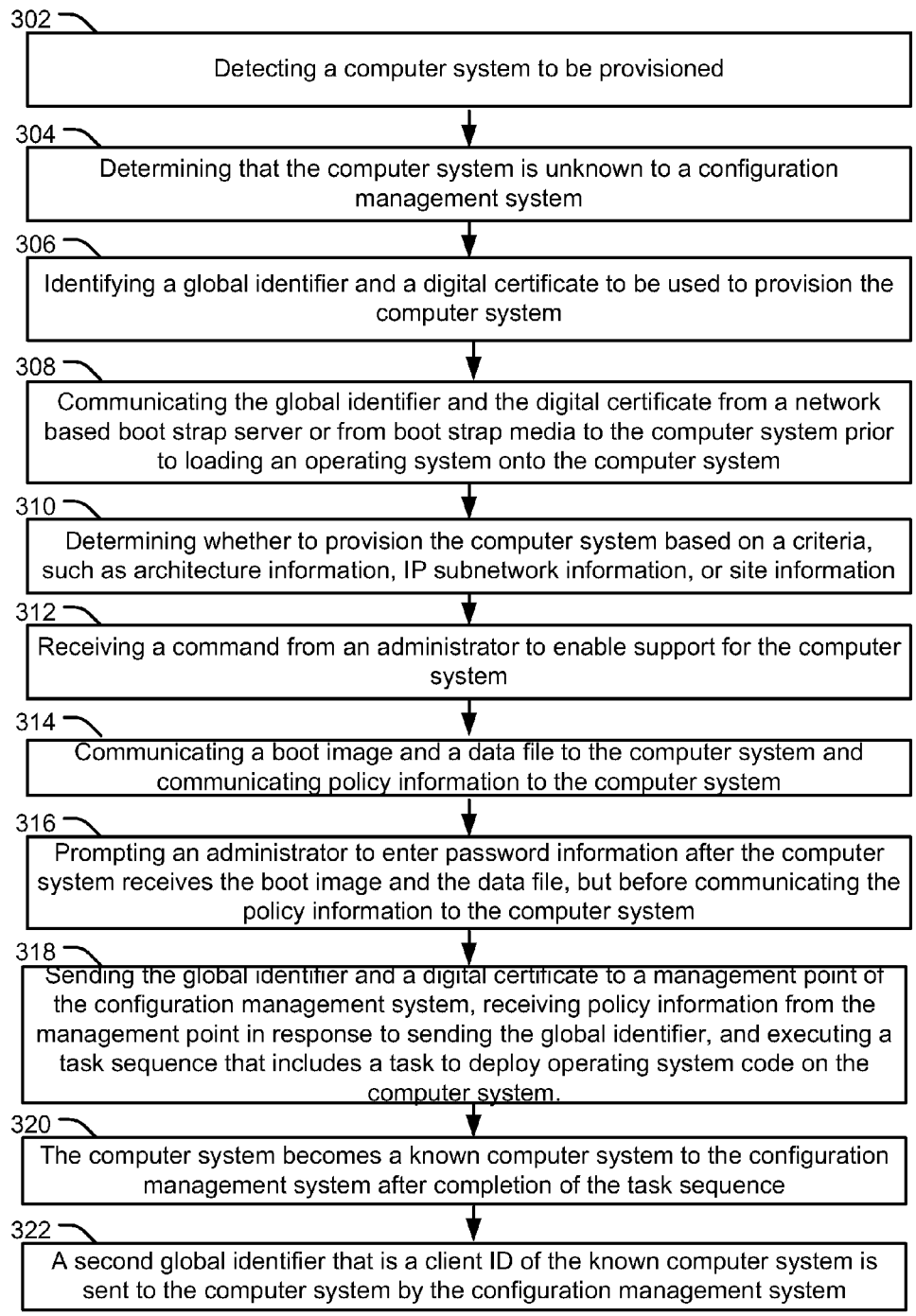
FIG. 3 is a flow diagram of a particular embodiment of a method of provisioning an unknown computer system.

Referring to FIG. 3, a particular embodiment of a method of provisioning an unknown computer system is illustrated. The method includes detecting a computer system to be provisioned, at 302, and determining that the computer system to be provisioned is unknown to a configuration management system, at 304. The method further includes identifying a global identifier, such as a global user identifier (GUID), and a digital certificate to be used to provision the computer system, as shown at 306. The method further includes communicating the global identifier and the digital certificate from a network based boot strap server or from boot strap media to the computer system prior to loading an operating system onto the computer system, at 308. The method further includes determining whether to provision the computer system based on a criteria, such as architecture information, IP subnetwork information, or site information, at 310. The method includes receiving a command from an administrator to enable support for the computer system, at 312. The method further includes communicating a boot image and a data file to the computer system and further includes communicating policy information to the computer system, at 314.

Policy information may include boot options and other administrative rules retrieved from a policy server or directory.

In addition, the method includes prompting an administrator to enter password information after the computer system receives the boot image and the data file but before communicating policy information to the computer system, at 316. Policy information can be sent to the computer system after authentication, such as via verification of the password information. The method further includes sending the global identifier and the digital certificate to a management point of the configuration management system, receiving policy information from the management point in response to sending the global identifier and the digital certificate, and executing a task sequence that includes a task to deploy operating system code on the computer system, as shown at 318. The computer system becomes a known computer system to the configuration management system after completion of the task sequence and after a system management agent is installed and issues a client ID for the known system, as shown at 320. At this point, the unknown computer system has become a known computer system and is able to communicate and has visibility to the configuration management system. At 322, the method further includes sending a second global identifier, which may be a client identifier of a known system to the computer system from the configuration management system.

In a particular embodiment, the method includes making a determination as to whether to provision the unknown computer system based on criteria such as the architecture of the computer system, IP subnetwork information, or site information. In a particular embodiment, the network based boot strap server is a PXE server that supports the PXE protocol. In a particular embodiment, the boot strap media is a compact disk (CD), a digital video disk (DVD), or a universal serial bus (USB) device that supports a system boot operation. In addition, the method may optionally include receiving a command from an administrator to enable support for the computer system. Also, the method may include communicating the boot image and data file to the computer system and communicating policy information to the computer system upon receipt of a request during a pre-execution stage prior to authentication. In a particular embodiment, the method also includes prompting an administrator to enter password information after the computer system receives the boot image and the data file but before communicating the policy information to the computer system.

Figure 4:
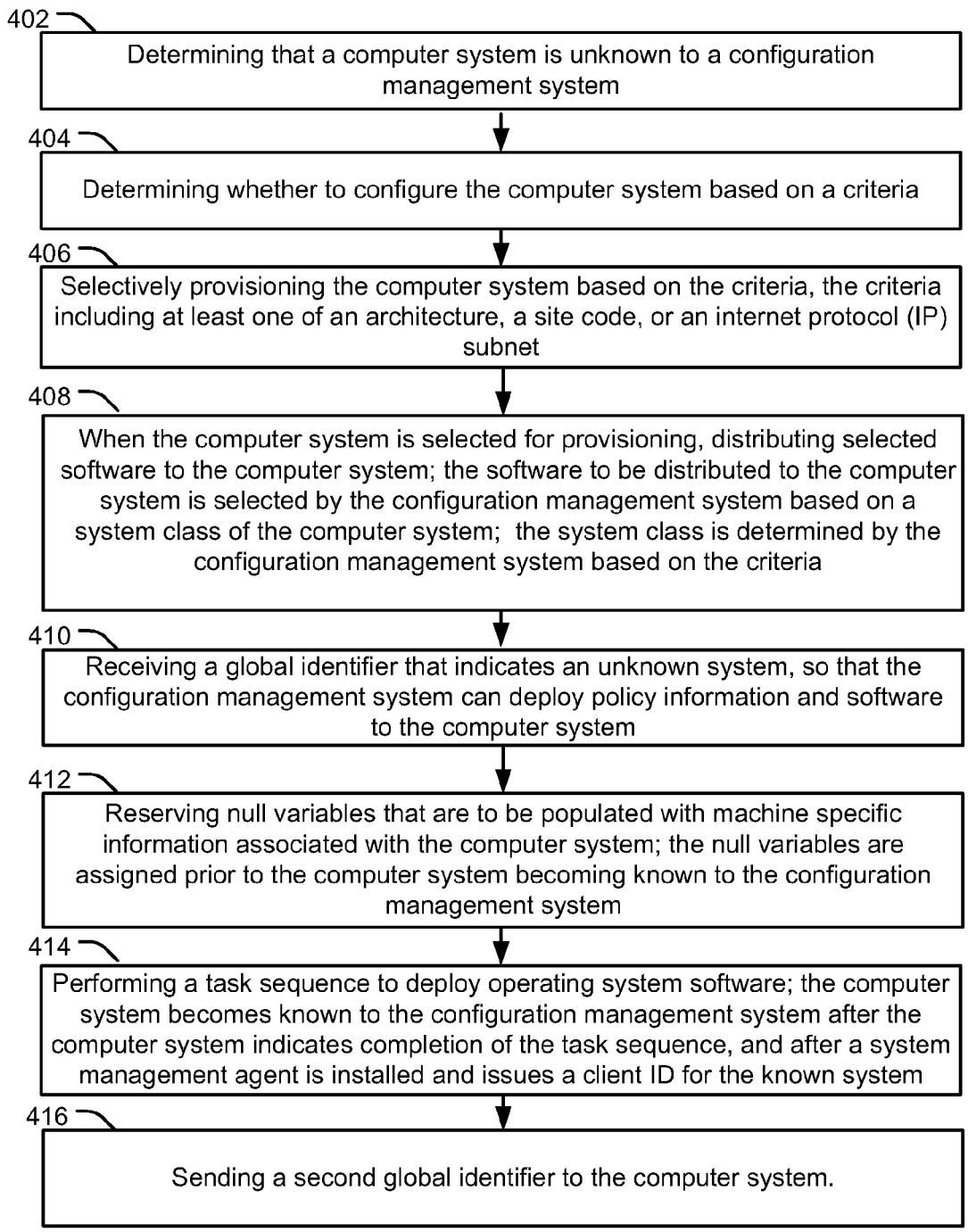
FIG. 4 is a flow diagram of a particular embodiment of a method of targeting a computer system to provide selected software to the computer system.

Referring to FIG. 4, a particular embodiment of a method of targeting a computer system to provide selected software to the computer system is illustrated. The method includes determining that a computer system is unknown to a configuration management system, at 402, and determining whether to configure the computer system based on a criteria, at 404. An example of the criteria includes architecture information of the computer system, site information, or internet protocol (IP) subnetwork information. An example of the architecture information is the type of processor of the unknown computer system, such as an X86 or X64 processor architecture. The method further includes selectively provisioning the computer system based on the criteria, as shown at 406.

When the computer system is selected for provisioning, the method distributes selected software to the computer system, as shown at 408. The software to be distributed to the computer system is selected by a configuration management system based on a system class of the computer system, where the system class is determined by the configuration management system based on the criteria, as shown at 408. The method further includes receiving a global identifier that indicates an unknown system so that the configuration management system may deploy policy information and software to the computer system, at 410. Null variables that are to be populated with system specific information associated with the computer system are reserved, at 412. The null variables are assigned prior to the computer system becoming known to the configuration management system.

The method further includes performing a task sequence to deploy operating system software, at 414. The computer system becomes known to the configuration management system after the computer system indicates completion of the task sequence and after a system management agent is installed and issues a client ID for the known system. The method further includes sending a second global identifier to the computer system. The computer system may be a computer system installed in a data center, at 416.

In a particular illustrative embodiment, the configuration management system receives the global identifier that indicates the unknown computer system and the configuration management system deploys policy information and software to the computer system. In addition, the unknown computer system may be one of a plurality of computer systems installed in a data center environment. The use of an automated method as described herein to provision unknown computer systems may be an efficient tool for management of the data center environment that includes multiple computer systems. In addition, upon receipt of the policy information and software from a management point of the configuration management system, the unknown computer system may install a management agent that performs actions of the configuration management system. At this stage, the computer system is known to the configuration management system and the installed management agent is used to perform configuration management system functions. An example of configuration management system functions includes data collection and reporting of activities at an administrative terminal for system control and management.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, such as computer program instructions executable by a processor, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of targeting a computer system to provide selected software to the computer system, the method comprising:
   determining that a computer system is unknown to a configuration management system;
   determining whether to configure the computer system based on a criteria;
   selectively provisioning the computer system based on the criteria, the criteria including at least one of an architecture, a site code, and an internet protocol (IP) subnet; and
   when the computer system is selected for provisioning, distributing selected software to the computer system, wherein the software distributed to the computer system is selected by the configuration management system based on a system class of the computer system, wherein the system class is determined by the configuration management system based on the criteria, wherein the configuration management system receives a global identifier that indicates that the computer system is an unknown system, wherein the configuration management system deploys policy information and the selected software to the computer system, and wherein the configuration management system reserves null variables that are to be populated with system specific information associated with the computer system, the null variables assigned prior to the computer system becoming known to the configuration management system.

2. The method of claim 1, wherein the system class is one of a group of systems, each group selected based on a set of the criteria.

3. The method of claim 1, wherein the computer system performs a task sequence to deploy operating system software, and wherein the computer system becomes known to the configuration management system after the computer system indicates completion of the task sequence and after a system management agent is installed and issues a client ID for the known system.

4. The method of claim 3, wherein the task sequence is selected based on the architecture, the site code, and the IP address of the computer system.

5. The method of claim 1, further comprising sending a second global identifier to the computer system.

6. The method of claim 1, wherein the computer system is installed in a data center environment.

7. The method of claim 1, wherein a management agent from the configuration management system is installed onto the computer system, such that the computer system is known to the configuration management system and such that the configuration management system can manage the computer system.

8. The method of claim 1, further comprising sending the global identifier to a management point of the configuration management system, receiving policy information from the management point in response to sending the global identifier, and executing a task sequence that includes a task to deploy operating system code on the computer system, wherein the computer system becomes a known system to the configuration management system after completion of the task sequence, and wherein an installed management agent performs configuration management system functions including data collection and reporting of activities of the computer system to an administrative terminal of the configuration management system.

9. The method of claim 1, wherein the computer system is one of a plurality of systems installed in a data center facility, wherein the configuration management system uses dedicated resources for a plurality of unknown systems, the plurality of unknown systems including the computer system and at least one other system of the plurality of systems installed in the data center facility, wherein the dedicated resources are identified using a flag, and wherein each of the unknown systems is viewable in an un-provisioned systems folder under an object-based storage device node of the configuration management system.

* * * * *